United States Patent
Romero et al.

(10) Patent No.: US 7,936,829 B2
(45) Date of Patent: May 3, 2011

(54) DRIVING MULTIPLE CONSECUTIVE BITS IN A SERIAL DATA STREAM AT MULTIPLE VOLTAGE LEVELS

(75) Inventors: Gabriel L. Romero, Colorado Springs, CO (US); Frederick G. Smith, Colorado Springs, CO (US); Brian E. Burdick, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1131 days.

(21) Appl. No.: 10/971,216

(22) Filed: Oct. 22, 2004

(65) Prior Publication Data

US 2006/0088110 A1 Apr. 27, 2006

(51) Int. Cl.
*H04B 3/00* (2006.01)
*H04B 1/38* (2006.01)

(52) U.S. Cl. .......................... 375/257; 375/219

(58) Field of Classification Search .......... 375/257, 375/219, 220
See application file for complete search history.

(56) References Cited

U.S. PATENT DOCUMENTS

| 5,612,912 | A | * | 3/1997 | Gillingham | 365/168 |
| 6,317,236 | B1 | * | 11/2001 | Saunders | 398/98 |
| 6,487,620 | B1 | * | 11/2002 | Grosshog et al. | 710/107 |
| 6,704,218 | B2 | * | 3/2004 | Rickes et al. | 365/145 |
| 6,791,483 | B2 | * | 9/2004 | Hattori | 341/101 |
| 2004/0240270 | A1 | * | 12/2004 | Visconti | 365/185.22 |
| 2004/0264227 | A1 | * | 12/2004 | Kojima et al. | 365/45 |
| 2005/0229053 | A1 | * | 10/2005 | Sunter | 714/724 |

* cited by examiner

*Primary Examiner* — David C. Payne
*Assistant Examiner* — Brian J Stevens

(57) ABSTRACT

Driving multiple consecutive bits having a same logic value in a serial data stream involves driving a first bit of the multiple consecutive bits in the serial data stream at an initial voltage level, and driving at least two additional bits of the multiple consecutive bits in the serial data stream at voltage levels stepped down from the initial voltage level.

18 Claims, 6 Drawing Sheets

DRIVING MULTIPLE CONSECUTIVE BITS IN A SERIAL DATA STREAM AT MULTIPLE VOLTAGE LEVELS

BACKGROUND

A serial communication system 100 generally includes two serial communication devices 102 and 104 connected by a serial communication bus, cable or transmission line 106, as shown in FIG. 1. The serial communication system 100 is usually included in a computer system, a network of computer systems, or other appropriate electronic devices. The serial communication devices 102 and 104 generally have serial transceivers 108 and 110, respectively, that generate, or drive, serial data stream signals back and forth through the transmission line 106.

Clock speeds for commercially available serial transceivers 108 and 110 currently enable serial data transfer rates up to three to four gigabits per second (3-4 Gbps). Such currently commercially available serial transceivers 108 and 110 may be defined according to specifications for serial communication standards, such as SAS (Serial Attached SCSI (Small Computer System Interface)), SATA (Serial ATA (Advanced Technology Attachment)), Gigabit Fibre Channel, Gigabit Ethernet and any other standard data transfer protocol. At this high serial data transfer rate, there is considerable "jitter" caused by intersymbol interference (ISI) in the serial data signals (along with other problems, such as noise in a power supply and wavering of a crystal oscillator), as will be described by the following explanation. The jitter and ISI problems increase as the serial data transfer rates increase.

The serial transceivers 108 and 110 typically "lock" onto, or "recover," the clock of the serial data stream signals received from each other with a phase locked loop (PLL) that detects an initial stream of alternating logic 1s and 0s in the serial data stream. The PLL effectively locks onto rising and falling edges in the serial data stream in order for the serial transceivers 108 and 110 to identify the bits in the serial data stream. The ISI problems can cause the timing of the rising and falling edges in the serial data stream to move from their ideal locations in time. Such timing variations are referred to as the "jitter" in the signal. If the jitter is large enough, a bit in the serial data stream may be lost, or the PLL may lose the lock on the clock of the serial data stream signals. To ensure that no bits are lost and that the PLL maintains the lock on the clock of the serial data stream signals, the serial communication standards require an 8B10B encoding scheme (whereby eight bits of data are encoded into ten bits) that allows for a run of consecutive bits having the same logic value (either logic high 1, or logic low 0) for no more than five bits. In this manner, the time between rising and falling edges in the serial data stream is held to a maximum, so the timing variations jitter) are minimized, and the PLL can keep the lock on the clock and ensure accurate data reception at the serial transceivers 108 and 110. As long as the timing variations fall within an allowable "budget" for the amount of jitter a transceiver 108 or 110 can tolerate, the transceiver 108 or 110 can operate properly.

The ISI is affected by characteristics of the transmission line 106. These characteristics are represented by a simplified schematic diagram having serial linear resistors 112 and parallel parasitic linear capacitors 114. The resulting resistance and parasitic capacitance of the transmission line 106 increases with a longer transmission line 106. The transmission line 106 also has a characteristic parasitic linear inductance, but the inductance is very minor, so it is not shown in order to simplify the following analysis and explanation of the shortcomings in the prior art. Thus, the analysis is made with respect to a typical RC circuit.

The voltage response (vs. time) of the RC circuit of the transmission line 106 is illustrated by a graph 116 in FIG. 2. The voltage response graph 116 has an exponential curve with an early portion 118 where the slope is changing rapidly and a later portion 120 where the slope is changing slowly as the curve is approaching an asymptote 122. The capacitance of the transmission line 106 is charged in a corresponding manner. Upon changing from a logic high to a logic low, or vice versa, for the 3-4 Gbps data transfer rates and higher, the end of the bit time 124 for the current bit of the serial data stream occurs within the early portion 118 of the graph 116, where the voltage and the charge in the capacitance are changing rapidly. If the logic value does not change for the second bit, the end of the corresponding bit time 126 occurs further along the graph 116, but still within the early portion 118. Similarly, for the third, fourth and fifth bits, if the logic value still doesn't change, the ends of the corresponding bit times 128, 130 and 132, respectively, occur even further along the graph 116, but likely still within the early portion 118, particularly for the higher data transfer rates.

The resulting parasitic capacitive charge in the transmission line 106 is greater when the end of the last bit time 124-132 for consecutive bits of the same logic value is further up the graph 116. When the parasitic capacitive charge becomes greater, however, it then takes longer or requires a greater drive voltage to drive the signal on the transmission line 106 to the opposite logic value, because the parasitic capacitive charge has to be discharged. Thus, when the drive voltage for the first bit of consecutive bits of the same logic value is large enough to quickly drive the first bit to the desired logic value, the subsequent bits merely cause the parasitic capacitive charge to increase, thereby exacerbating the ISI problem. An example of this situation is illustrated by FIGS. 3 and 4.

A graph in FIG. 3 shows a waveform 134 (a differential signal) for an exemplary serial data stream in which all consecutive bits having the same logic value are driven at the same drive voltage. In this example, bits 136 and 138 are logic low, bits 140, 142, 144, 146 and 148 are logic high, bit 150 is logic low, bit 152 is logic high, bits 154, 156, 158 and 160 are logic low, and the last three bits 162, 164 and 166 are logic high. The drive voltage for each bit 136-166 is the same, as indicated by the distance above or below a threshold line 168. The threshold line 168 is ideally in the middle of the "swing" (i.e. the amplitude between the positive and negative maximums) of the waveform 134.

A graph in FIG. 4 shows a voltage response curve 170 for the waveform 134 of the exemplary serial data stream shown in FIG. 3. The voltage response for each group of consecutive bits having the same logic value (bits 136 and 138, bits 140-148, bits 154-160, and bits 162-166) includes an initial "spike" or "ringing" after which the voltage response settles into an "increasing" curve ("increasing" is positively or negatively away from a threshold line 172). The largest number of consecutive same-logic-value bits (five bits 140-148) allows the curve 170 to increase (to point 174) further than the smallest number of same-logic-value consecutive bits (two bits 136 and 138) allows the curve 170 to increase (to point 176). Therefore, the driving of the first bit 150 following the point 174 has more parasitic capacitive charge to overcome than does the driving of the first bit 140 following the point 176.

To reduce the parasitic capacitive charge resulting from multiple consecutive same-logic-value bits, the waveform is shaped with a different voltage emphasis, or "precomp."

FIGS. 5 and 6 illustrate this situation with a waveform 178 (FIG. 5) for another exemplary serial data stream in which bits 180-210 have the same logic values as the bits 136-166 (FIG. 3). However, the bits 180-210 are not driven at the same drive voltage. Instead, the first bit (180, 184, 194, 196, 198 and 206) following an edge transition in the waveform 178 is driven at a higher drive voltage; whereas, the bits (182, 186-192, 200-204, 208 and 210) that consecutively follow previous bits (180, 184, 198 and 206) of the same logic value are driven at a lower "stepped-down" drive voltage. The lower drive voltage occurs at the second bit (182, 186, 200 and 208) of each group of multiple consecutive same-logic-value bits (180-182, 184-192, 198-204 and 206-210).

A voltage response curve 212 is shown in FIG. 6 for the waveform 178 of the exemplary data stream shown in FIG. 5. After the initial "spike" or "ringing," the voltage response curve 212 settles into an increasing curve, but at a lower level than did the voltage response curve 170 (FIG. 4) relative to a threshold line 214. Therefore, the point 216 to which the largest number of consecutive same-logic-value bits (five bits 184-192) allows the curve 212 to increase is lower than the point 174 (FIG. 4). Thus, the waveform 178 does not cause the parasitic capacitance of the transmission line 106 (FIG. 1) to charge up as high as does the waveform 134 (FIG. 3). As a result, the bits (180, 184, 194, 196, 198 and 206) are driven to their logic value more rapidly and with less ISI and jitter than are the bits (136, 140, 150, 152, 154 and 162; FIG. 3).

This method of setting the emphasis for the waveform 178 has been demonstrated to work effectively for serial data transfer rates up to 3-4 Gbps. However, this method of setting the emphasis has proven much less effective for faster data transfer rates, since the voltage step is generally too large for short groups of same-logic-value bits (e.g. 2 bits) and too little for long groups of same-logic-value bits (e.g. 5 bits), due to a larger relative difference in capacitive charging for faster data transfer rates than for slower data transfer rates.

It is with respect to these and other considerations that the present invention has evolved.

DETAILED DESCRIPTION

A serial communication system 300 incorporating an embodiment of the present invention and/or operating according to an embodiment of the present invention generally includes at least two devices 302 and 304 connected by a serial communication bus, cable, printed circuit board traces or serial transmission line 306. Both of the devices 302 and 304 have serial communication capabilities and communicate with each other across the serial transmission line 306. However, only one or both of the devices 302 and 304 incorporates, or operates according to, an embodiment of the present invention. For purposes of this description, however, it will be assumed that both of the devices 302 and 304 incorporate an embodiment of the present invention, since both devices 302 and 304 are shown having similarly named and described components.

Figure 1:
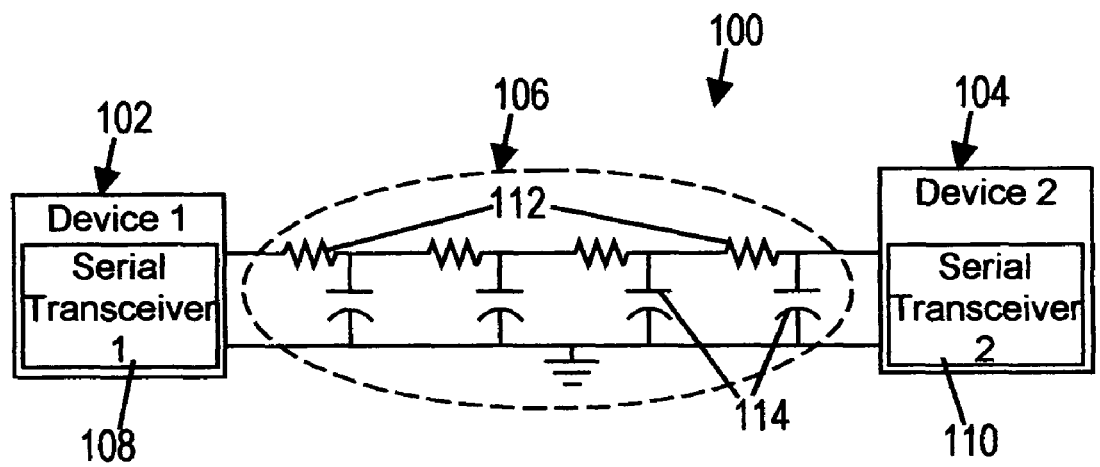
FIG. 1 is a simplified schematic diagram of a prior art serial communication system.
Figure 2:
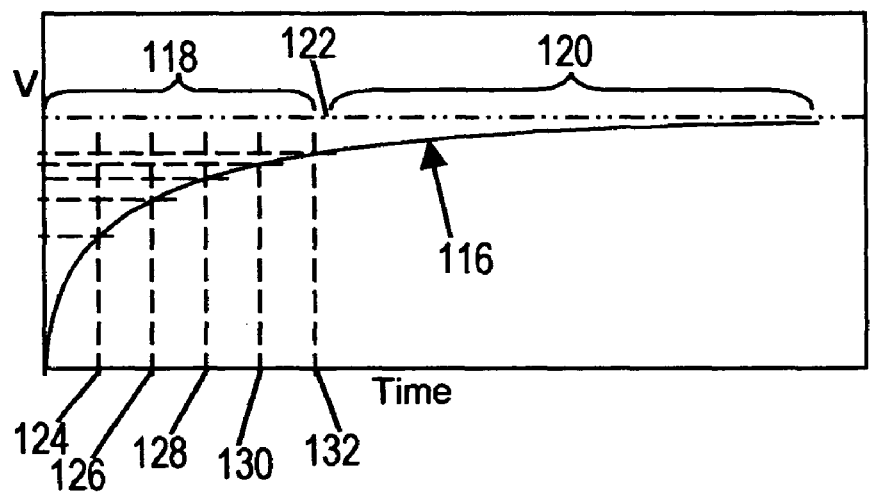
FIG. 2 is a graph of a voltage response for an RC circuit incorporated in the prior art serial communication system shown in FIG. 1.

Similar to the transmission line 106 (FIG. 1), the serial transmission line 306 has a characteristic impedance, due to a linear resistance (illustrated by series resistors 308) and a linear parasitic capacitance (illustrated by parallel capacitors 310). (Although the serial transmission line 306 also has a series linear inductance, the inductance can be discounted and is not shown, since it has little overall effect when a serial data stream is stable at one logic value for a relatively long period of time.) The serial transmission line 306, therefore, has a simplified voltage response generally similar to that shown for transmission line 106 in FIG. 2.

The serial data stream transmitted through the serial transmission line 306, consequently, will experience some amount of jitter, due to ISI (intersymbol interference) and other causes. The present invention reduces the ISI and, thus, the jitter, thereby enhancing the transmission of the serial data stream, particularly at higher data transmission rates (e.g. above 3-4 Gbps). According to various embodiments, the present invention reduces the parasitic capacitance charge that has to be overcome when driving a transitioning bit following multiple consecutive same-logic-value bits, thereby enabling the transitioning bit to be driven more rapidly and preventing a shift in the rising and falling edges in the serial data stream from their ideal locations in time.

The devices 302 and 304 generally include, among other components, serial transceivers 312 and 314, respectively, for serializing and de-serializing data and for transmitting and receiving serial data streams to and from each other across the transmission line 306. The serial transceivers 312 and 314 generally include serial I/O (input/output) nodes 316 and 318, respectively, and I/O logic 320 and 322, respectively. The serial data streams are transmitted and received at the serial I/O nodes 316 and 318. The I/O logic 320 and 322 include logic functionality or circuitry to generate the serial data stream when either device-302 or 304 is transmitting the serial data stream. The I/O logic 320 and 322 also include logic functionality to detect the serial data stream when either device 302 or 304 is receiving the serial data stream. Additionally, when receiving the serial data stream, the I/O logic 320 or 322 locks onto, or recovers, the clock of the serial data stream, or establishes the "bit time" of the serial data stream, with a PLL that detects an initial stream of bits having alternating logic values. According to some embodiments, the serial transceivers 312 and 314 also store parameters 324 and 326, respectively, that effectively provide instructions to the I/O logic 320 and 322 regarding how to generate and drive bits in the serial data stream through the serial I/O nodes 316 and 318.

Figure 3:
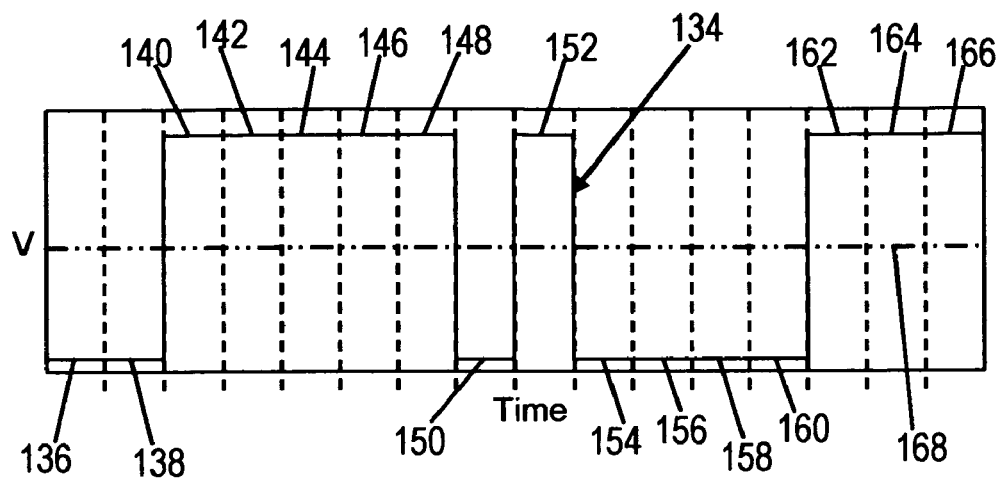
FIG. 3 is a graph of a prior art waveform for an exemplary serial data stream used in the prior art serial communication system shown in FIG. 1.
Figure 8:
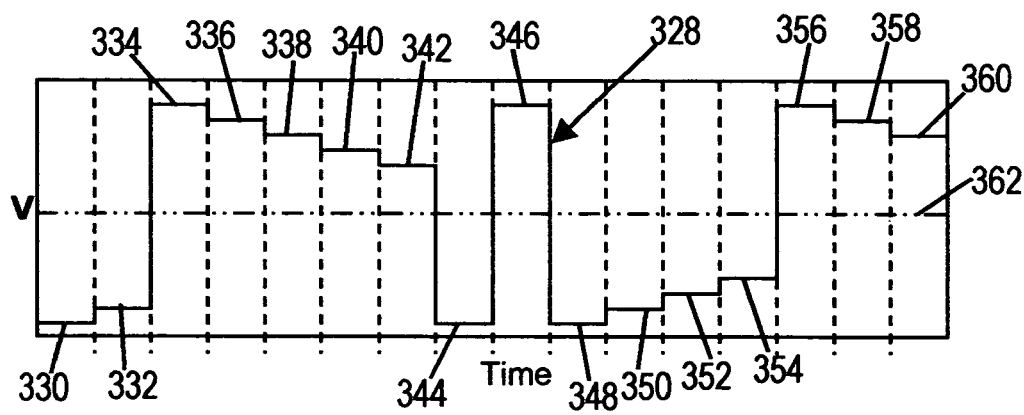
FIG. 8 is a graph of a waveform, according to an embodiment of the present invention, for an exemplary serial data stream used in the serial communication system shown in FIG. 7.

Generally, the I/O logic 320 and 322 include logic functionality to generate and drive the bits of the serial data stream according to a drive waveform, such as exemplary waveform 328, shown in FIG. 8, for a segment of an exemplary serial data stream having bits 330-360. The logic values of the bits 330-360 are generally the same as that for the bits 136-166 (FIG. 3). However, the voltage levels at which the bits 330-360 are driven at the serial I/O node 316 or 318 by the I/O logic 320 or 322 are not necessarily the same as that for the bits 136-166. Instead, each bit 330, 334, 344, 346, 348 and 356 following a rising or falling edge, or a logic transition, in the waveform 328 is driven at a certain initial voltage level; and each bit 332, 336-342, 350-354 and 358-360 consecutively following a bit having the same logic value is driven at a voltage level that is "stepped down" (i.e. stepped closer to a central threshold voltage level 362) from the voltage level at which the preceding bit was driven. The voltage emphasis is adjusted at each bit after the first bit of a group of consecutive same-logic-value bits, instead of only at the first subsequent bit after the first bit, as described in the background with respect to FIG. 5. Thus, each bit subsequent to a previous bit having the same logic value is driven at a voltage level stepped down from the voltage level at which the previous bit was driven, as long as the final bit in any group of multiple same-logic-value bits is driven at a voltage level sufficiently above (or below) the threshold voltage level 362 such that the bit is not mistakenly clocked with the wrong logic value. In this manner, for a five-bit group of same-logic-value bits, such as bits 334-342, the first bit 334 is driven at a first voltage level, the second bit 336 is driven at a second voltage level stepped down from the first voltage level, the third bit 338 is driven at a third voltage level stepped down from the second voltage level, the fourth bit 340 is driven at a fourth voltage level stepped down from the third voltage level, and the fifth bit 342 is driven at a fifth voltage level stepped down from the fourth voltage level. Therefore, the I/O logic 320 and 322 include logic functionality or circuitry to adjust the emphasis setting of the drive waveform on a per bit basis. Additionally, although the longest group of multiple consecutive same-logic-value bits is shown as being five bits long (bits 334-342) in this example, it is understood that the present invention is not so limited, but may be used with any number of multiple consecutive same-logic-value bits.

Figure 4:
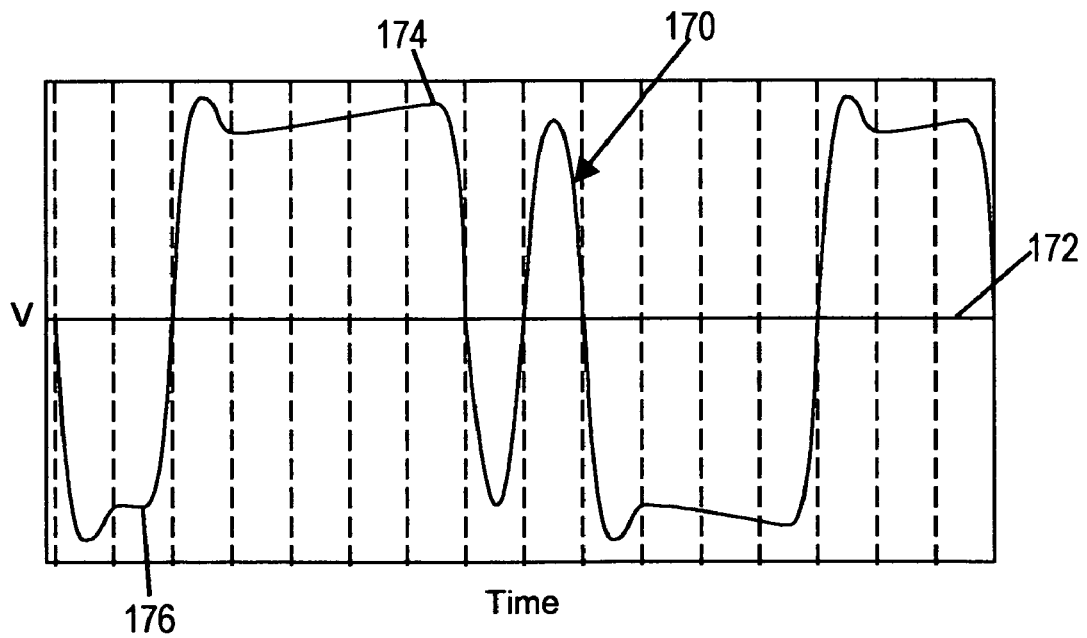
FIG. 4 is a graph of a voltage response curve for the prior art waveform shown in FIG. 3.
Figure 6:
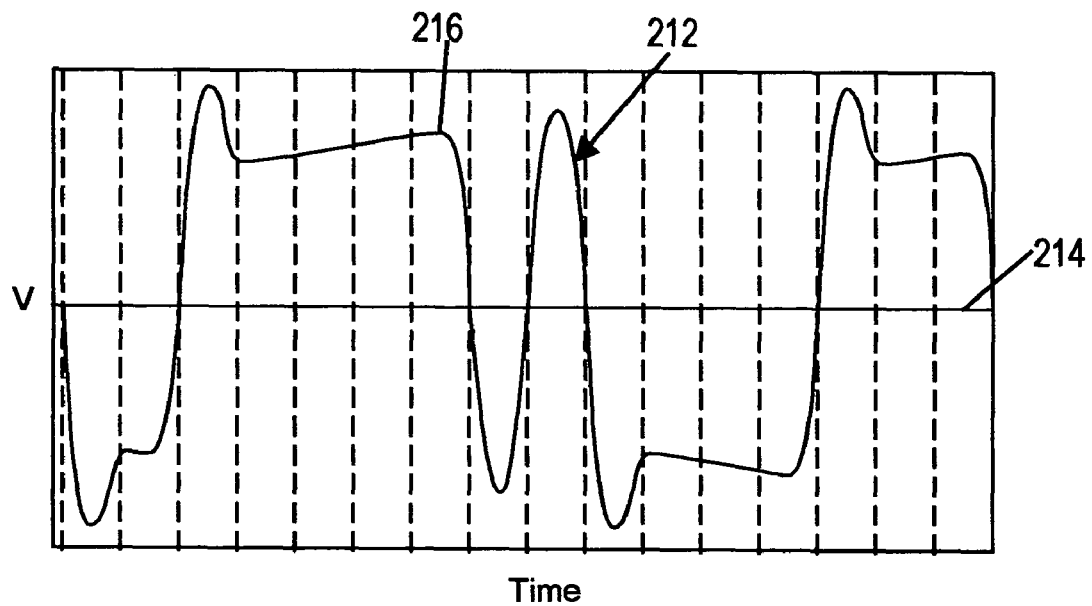
FIG. 6 is a graph of a voltage response curve for the prior art waveform shown in FIG. 5.
Figure 9:
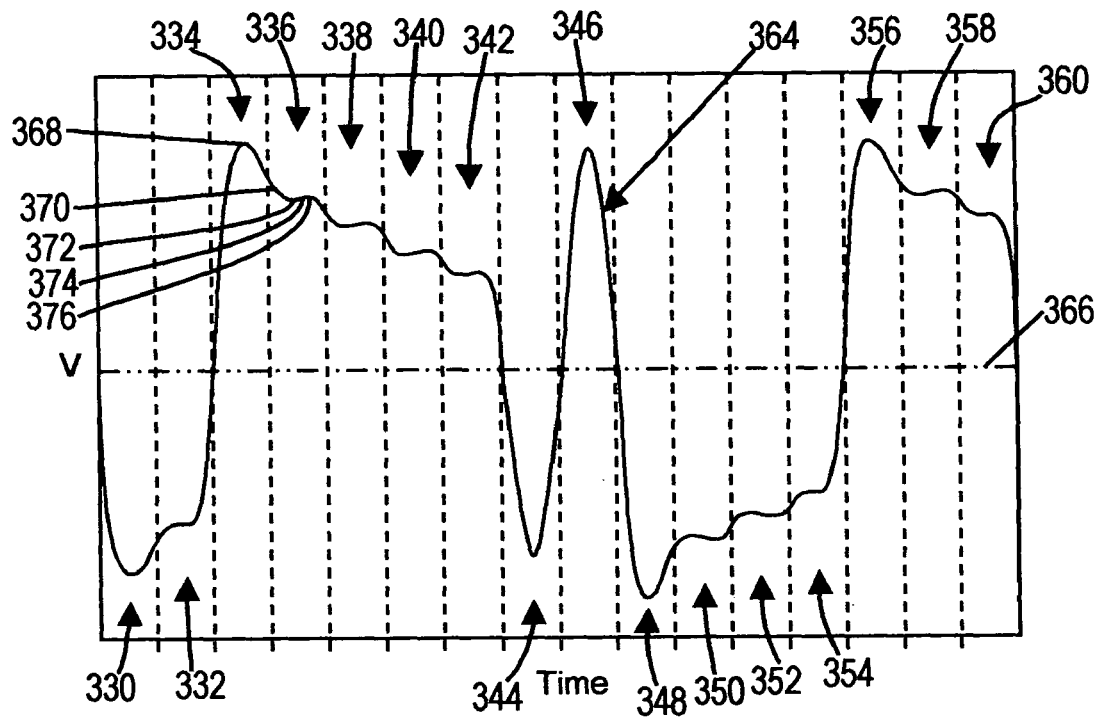
FIG. 9 is a graph of a voltage response curve for the waveform shown in FIG. 8 according to an embodiment of the present invention.

The voltage response of the serial transmission line 306 is illustrated by a curve 364, as shown in FIG. 9. The voltage response at each first bit (330, 334, 348 and 356) of the groups of consecutive same-logic-value bits (330-332, 334-342, 348-354 and 356-360) includes an initial spike, or ringing, (e.g. spike 368 at bit 334) in the voltage response curve 364, as also seen in the prior art voltage response curves 170 (FIG. 4) and 212 (FIG. 6). Additionally, the voltage response at each second bit (332, 336, 350 and 358) of the groups of consecutive same-logic-value bits (330-332, 334-342, 348-354 and 356-360) initially decreases (e.g. a post-spike decrease at 370 at bit 336) toward a threshold voltage level 366 from the spike (e.g. 368). This response is similar, though not necessarily identical, to the decrease seen in the prior art voltage response curve 212. According to some embodiments, the post-spike decrease (e.g. at 370) is less than the post-spike decrease seen in the prior art voltage response curve 212, since the voltage emphasis is adjusted at each bit, or for multiple data patterns, and therefore doesn't have to be decreased more than is needed at any one bit. The post-spike decrease (e.g. at 370) in the voltage response curve 364 at each second bit (332, 336, 350 and 358) is greater than the post-spike decrease seen in the prior art voltage response curve 170, since the drive voltage for each second bit (332, 336, 350 and 358) has been stepped down.

The post-spike decrease (e.g. at 370) ends at a trough (e.g. at 372 at bit 336) at each second bit (332, 336, 350 and 358). After the second-bit trough (e.g. at 372), the voltage response curve 364 starts to increase (e.g. at 374 at bit 336), due to the parasitic capacitive charging in the serial transmission line 306. The voltage response increase at this point (e.g. at 374 at bit 336) is similar to the increase up to the point 216 (FIG. 6) to which the largest number of consecutive same-logic-value bits (five bits 184-192) allowed the curve 212 to increase, due to parasitic capacitive charging. However, this voltage increase ends at a peak (e.g. at 376 at bit 336), due to the next step down in the drive voltage for the next bit (e.g. bit 338).

The decrease (e.g. at 370), the trough (e.g. at 372), the increase (e.g. at 374) and the peak (e.g. at 376) are repeated for each subsequent bit (e.g. 338, 340 and 342), if any, of each group of consecutive same-logic-value bits (e.g. bits 334-342), until the logic value of the next bit is different. In this manner, the voltage emphasis setting, or drive voltage, for each bit in the serial data stream is dependent on the number of consecutive same-logic-value bits. Thus, according to some embodiments, the logic functionality of the I/O logic 320 or 322 determines the number of consecutive same-logic-value bits in order to determine the voltage steps.

Figure 5:
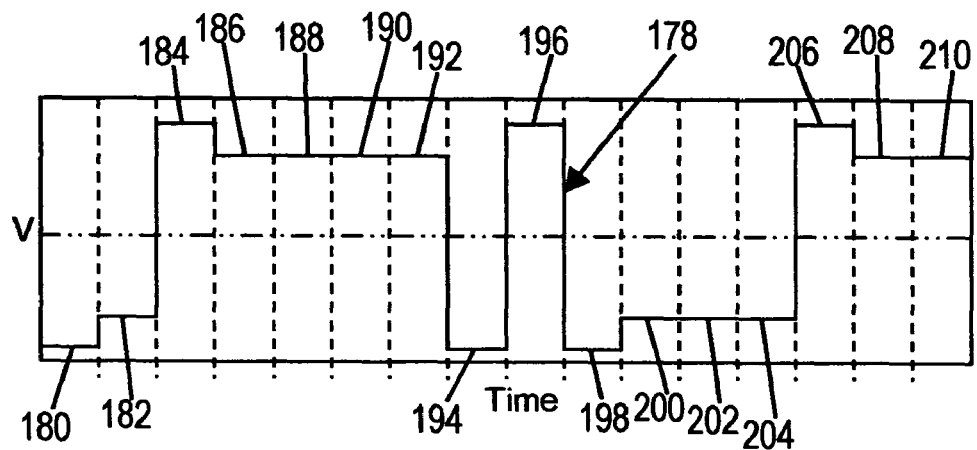
FIG. 5 is a graph of another prior art waveform for an exemplary serial data stream used in the prior art serial communication system shown in FIG. 1.
Figure 7:
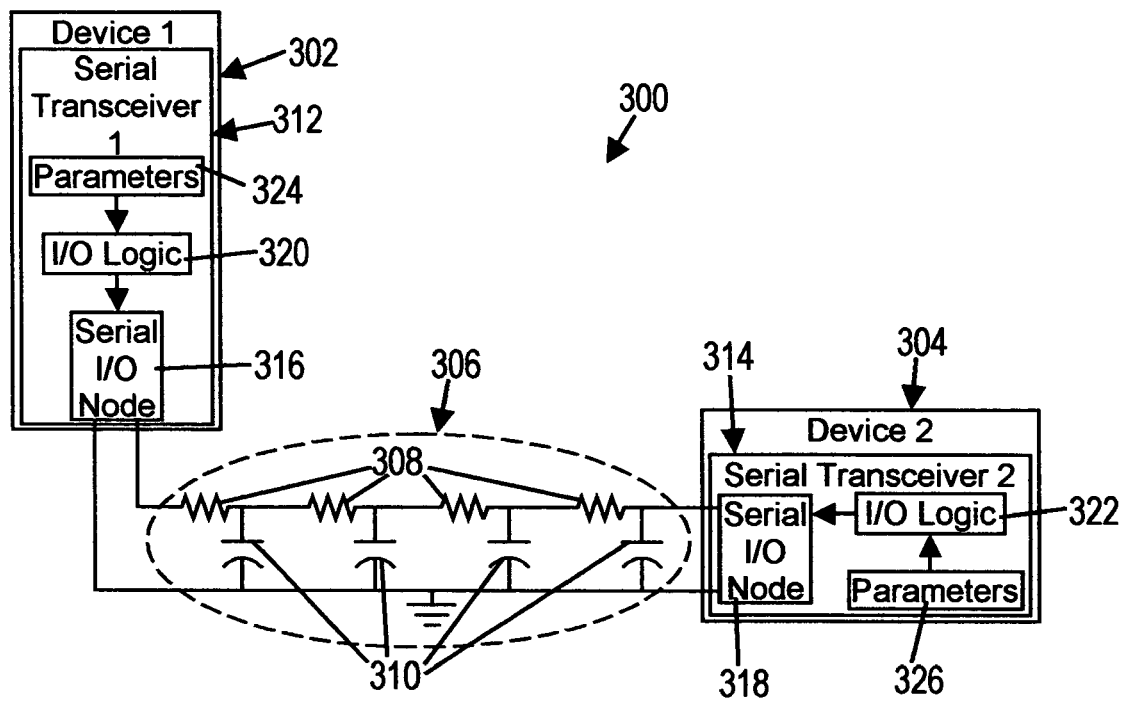
FIG. 7 is a simplified schematic diagram of a serial communication system according to an embodiment of the present invention.

On the other hand, if the serial communication system 300 (FIG. 7) used the single step-down method described in the background with reference to FIGS. 5 and 6, then a single step down to the voltage level used to drive the fifth bit 342 could be too big of a step for a group of only two consecutive same-logic-value bits (e.g. bits 330-332), depending on the data transmission rate or the length of the serial transmission line 306, and could result in loss of the second bit. Additionally, a single step down to the voltage level used to drive the second bit 336 would be too little of a step by the time of the fifth bit 342, since the parasitic capacitance of the serial transmission line 306 could overcharge.

Figure 10:
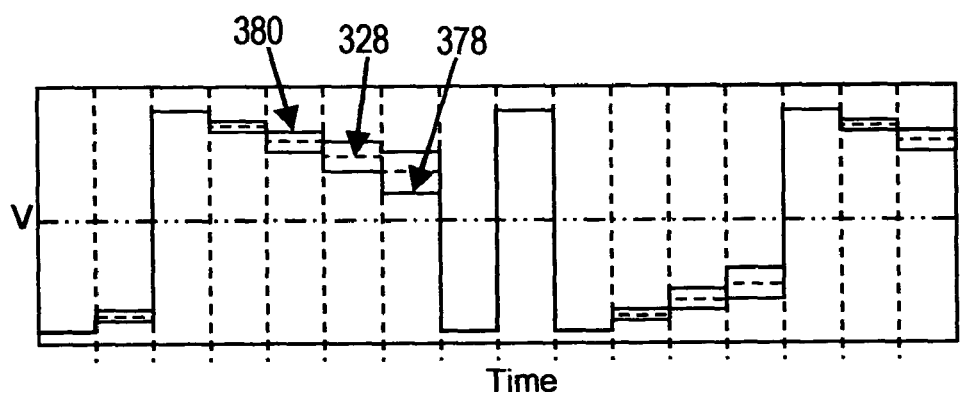
FIG. 10 is a graph of an alternative waveform, according to another embodiment of the present invention, for an exemplary serial data stream used in the serial communication system shown in FIG. 7.

Alternative waveforms 378 and 380 for driving the bits of an exemplary serial data stream are shown in FIG. 10. The waveform 328 (see also FIG. 8) is shown in dashed lines with the alternative waveforms 378 and 380 in order to illustrate that the magnitude of the steps by which the voltage level is changed for each bit may be made larger or smaller, e.g. depending on the length of the serial transmission line 306 or the data transfer rate. Thus, depending on the environment, different "scaling factors" may be used to set the magnitude of the steps.

Figure 11:
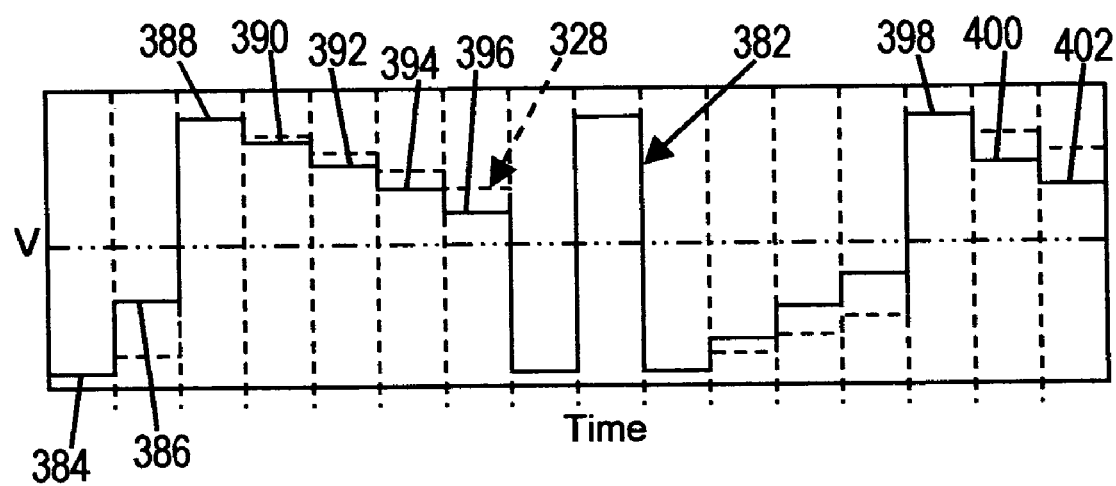
FIG. 11 is a graph of another alternative waveform, according to another embodiment of the present invention, for an exemplary serial data stream used in the serial communication system shown in FIG. 7.

Another alternative waveform 382 for driving the bits of an exemplary serial data stream is shown in FIG. 11. The waveform 328 (see also FIG. 8) is shown in dashed lines with the alternative waveform 382 in order to illustrate that the magnitude of the steps by which the voltage level is changed for each bit may be made larger or smaller, depending on the number of bits in the groups of multiple consecutive same-logic-value bits. Thus, according to some embodiments, the logic functionality of the I/O logic 320 or 322 determines the number of consecutive same-logic-value bits in order to determine the magnitude of the voltage steps. For instance, the first group of multiple consecutive same-logic-value bits has only two bits 384 and 386, whereas the second group of multiple consecutive same-logic-value bits has five bits 388, 390, 392, 394 and 396. Therefore, the step for bit 386 may be larger than the steps for each of the bits 390, 392, 394 and 396. Additionally, not all the steps have to be the same for every bit in the same group of multiple consecutive same-logic-value bits, as illustrated by the steps between bits 398 and 400 and between bits 400 and 402.

Prior to being serialized, the data is typically in parallel form. Therefore, the actual voltage steps may be determined by reading the data pattern directly from the parallel data and setting the magnitude of the voltage steps accordingly. Alternatively, if the magnitude of each voltage step is to be the same, then the I/O logic 320 or 322 can merely reset the emphasis by a given amount each time a bit follows another bit having the same logic value, without regard to the total number of consecutive same-logic-value bits.

Consequently, according to the various embodiments described herein, the voltage steps may be optimized, or the emphasis may be "tuned," for any data pattern, any serial transmission line 306 and/or any data transfer protocol. In this manner, the serial communication capabilities of the devices 302 and 304 may be optimized for any environment.

The parameters 324 or 326 (FIG. 7) may be used to customize the settings for the magnitudes of the steps, depending on the environment in which the devices 302 and 304 are incorporated. The parameters 324 and 326 may be hardwired into the serial transceivers 312 and 314 or set by firmware upon initialization, or power-on, of the devices 302 and 304. The environment may be defined by the data transfer rate, the length of the serial transmission line 306 and/or any other characteristic that affects the signals on the serial transmission line 306. Additionally, a customer incorporating the devices 302 and/or 304 into a larger circuit or design may specify the environment and be provided with the necessary parameters 324 and/or 326, or firmware revision, without any understanding of the significance of the parameters 324 and/or 326.

Due to greater tailoring of the steps, embodiments of the present invention may operate within a much wider variety of environments than may the prior art described in the background. In fact, a single set of parameters 324 and 326 may suffice for many common environments in which the embodiments may be incorporated. Thus, the parameters 324 and 326 may be set upon manufacturing the devices 302 and 304 to default values that work for most such common environments, thereby obviating the need to provide different parameters 324 and 326 to many customers in many situations. The preferred step magnitudes or waveforms may be determined empirically for each type of environment and data transfer protocol, and the preferred parameters may be set accordingly. In other words, the waveform may be "generic" for most environments.

Presently preferred embodiments of the present invention and many of its improvements have been described with a degree of particularity. This description is of preferred examples of implementing the invention, and is not necessarily intended to limit the scope of the invention. The scope of the invention is defined by the following claims.

We claim:

1. A method of driving multiple consecutive bits having a same logic value in a series of bits of data comprising:
   driving a first bit of data of the multiple consecutive bits at an initial voltage level and a logic value across a serial transmission line of a serial communication system;
   driving at least two additional bits of data of the multiple consecutive bits at voltage levels stepped down from the initial voltage level and at the same logic value; and
   driving each bit of data subsequent to a previous bit of data at a subsequent voltage level stepped down from a previous voltage level at which the previous bit of data was driven and at the same logic value, wherein the amount of voltage stepped down for each bit of data is dependent on a number of consecutive bits and of the same magnitude and wherein a duration for the voltage level for each bit of the multiple consecutive bits is the same.

2. A method as defined in claim 1 further comprising:
   setting a parameter that controls amounts by which the subsequent voltage levels are stepped down from the previous voltage levels.

3. A method of driving bits in a series of bits of data, comprising:
   determining a number of consecutive bits having a same logic value in the series of bits of data, a first bit in the consecutive bits to be driven at a voltage level;
   determining voltage steps for reducing the voltage level at which each bit following the first bit in the consecutive bits having the same logic value is to be driven, wherein the voltage steps are the same magnitude for each of the consecutive bits and a duration for the voltage level for each of the consecutive bits is the same;
   driving the first bit at the voltage level across a serial transmission line of a serial communication system; and
   driving the each bit following the first bit at a reduced voltage level, the voltage steps dependent on the number of consecutive bits.

4. A method as defined in claim 3 wherein:
   each voltage step reduces the voltage level by a same amount.

5. A method as defined in claim 3 further comprising:
   setting a parameter that controls magnitudes of the voltage steps.

6. A method as defined in claim 3 further comprising:
   determining more than two consecutive bits having the same logic value for the number of consecutive bits.

7. A method of driving bits in a series of bits of data, comprising:
   driving a first bit in the series of bits of data at a first voltage level across a serial transmission line of a serial communication system;
   driving a second bit consecutive to the first bit at a second voltage level, the second bit having a same logic value as the first bit, and the second voltage level being stepped down from the first voltage level; and
   driving at least one additional consecutive bit subsequent to the second bit at an at least one additional voltage level, the at least one additional bit having the same logic value as the first and second bits, and the at least one additional voltage level being stepped down from the second voltage level, the amount of voltage being stepped down for each bit dependent on the number of the at least one additional consecutive bits and wherein a duration for the voltage level for each bit of the series of bits is the same.

8. A method as defined in claim 7 wherein:
   each bit subsequent to a previous bit and having the same logic value as the previous bit is driven at a subsequent voltage level stepped down from a previous voltage level at which the previous bit was driven.

9. A method of driving multiple consecutive bits having a same logic value comprising:
   setting a parameter that controls at least one voltage level for driving at least one of the bits;

driving a first bit of the multiple consecutive bits at a first voltage level across a serial transmission line of a serial communication system; and driving a second bit of the multiple consecutive bits at a second voltage level lower than the first voltage level in accordance with the set parameter, the parameter dependent on the number of the multiple consecutive bits, wherein a duration for the voltage level for each bit of the multiple consecutive bits is the same.

10. A serial communication device comprising:

a serial input/output (I/O) node at which a serial data stream is transmitted across a serial transmission line of a serial communication system to a different serial communication device, wherein a duration for the voltage level for each bit is the serial data stream is the same; and I/O logic connected to the serial I/O node and including logic functionality which drives more than two consecutive bits in the serial data stream having a same logic value at more than two voltage levels at the serial I/O node, wherein the voltage levels at which the I/O logic drives the bits are dependent on a number of the more than two consecutive bits and each of the levels differ by a constant magnitude.

11. A serial communication device as defined in claim 10 further comprising:

settable parameters that control the voltage levels at which the I/O logic drives the bits in the serial data stream.

12. A serial communication device as defined in claim 10 wherein:

the I/O logic further includes logic functionality which:

drives a first bit of the more than two consecutive bits in the serial data stream at an initial voltage level; and drives at least two additional bits of the more than two consecutive bits in the serial data stream at voltage levels stepped down from the initial voltage level.

13. A serial communication device as defined in claim 10 wherein:

the I/O logic further includes logic functionality which:

drives each bit subsequent to a previous bit in the more than two consecutive bits at a subsequent voltage level stepped down from a previous voltage level at which the previous bit was driven.

14. A serial communication device as defined in claim 10 wherein:

a first bit in the more than two consecutive bits is to be driven at a voltage level; and the I/O logic further includes logic functionality which:

determines a number of the more than two consecutive bits;

determines voltage steps for reducing the voltage level at which each bit following the first bit in the more than two consecutive bits is to be driven;

drives the first bit at the voltage level in the serial data stream; and reduces the voltage level by the voltage steps for each bit following the first bit.

15. A serial communication device comprising:

a means for outputting a series of bits of data across a serial transmission line of a serial communication system, wherein a duration for the voltage level for each bit of the series of data bits is the same; and a means for driving more than two consecutive bits having a same logic value in the series of bits of data at more than two voltage levels at the output means, the voltage levels being dependent on the number of the more than two consecutive bits and each of the levels differ by a constant magnitude.

16. A serial communication device as defined in claim 15 further comprising:

a means for setting parameters that control the voltage levels at which the driving means drives the more than two consecutive bits.

17. A serial communication device as defined in claim 15 wherein:

the driving means further drives each bit subsequent to a previous bit in the more than two consecutive bits at a subsequent voltage level stepped down from a previous voltage level at which the previous bit was driven.

18. A serial communication device as defined in claim 15 wherein:

the driving means drives a first bit in the more than two consecutive bits at a voltage level;

the serial communication device further comprises:

a means for determining a number of the more than two consecutive bits;

a means for determining voltage steps for reducing the voltage level at which each bit following the first bit in the more than two consecutive bits is to be driven, the voltage steps being dependent on the number of the more than two consecutive bits;

and further wherein the driving means reduces the voltage level by the voltage steps for each bit following the first bit.

* * * * *